Feb. 22, 1938.  E. G. McKINNEY  2,108,970
SYSTEM OF SPEED REGULATION
Filed April 20, 1934  2 Sheets-Sheet 1
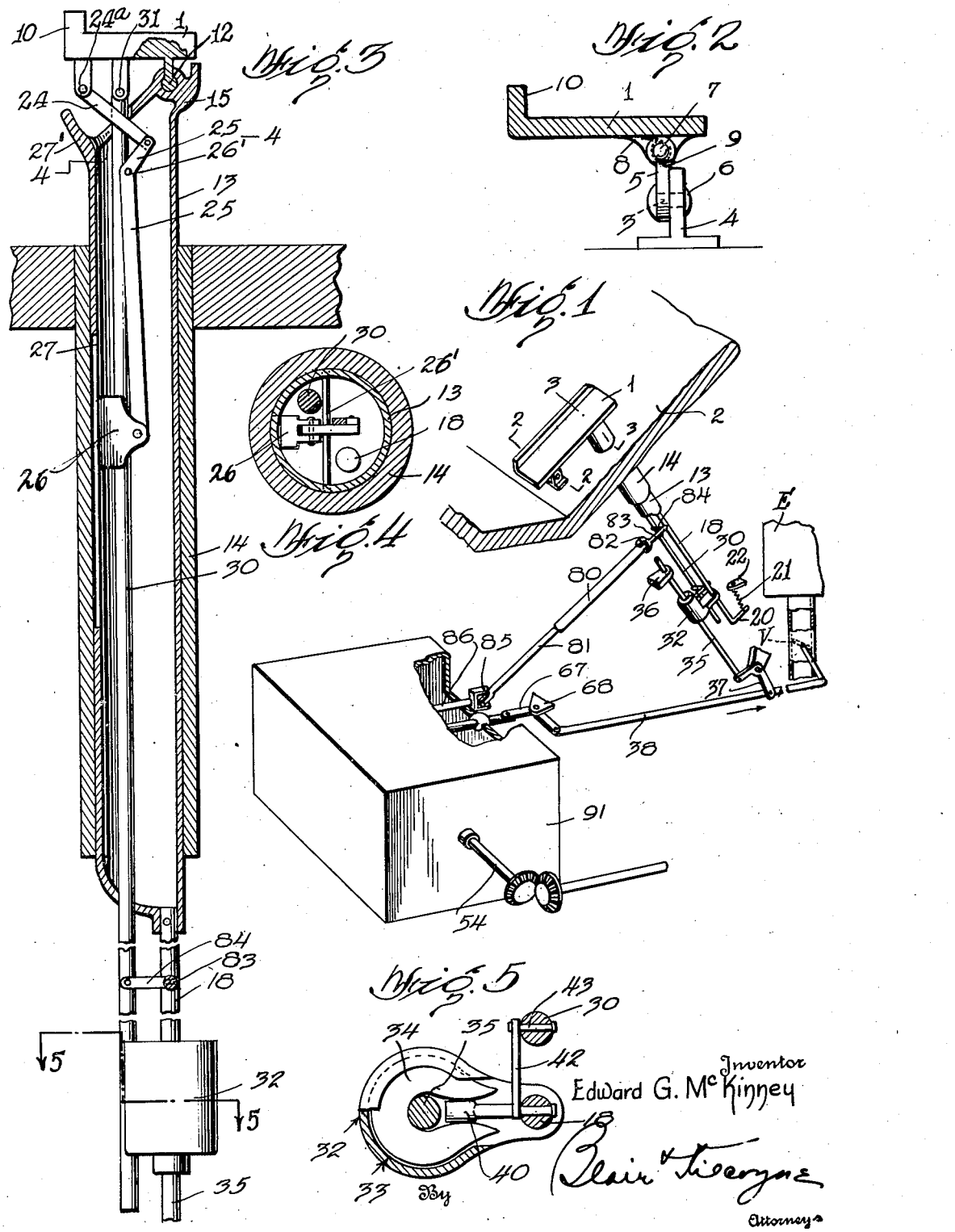
Inventor
Edward G. McKinney Feb. 22, 1938.   E. G. McKINNEY   2,108,970
SYSTEM OF SPEED REGULATION
Filed April 20, 1934   2 Sheets-Sheet 2
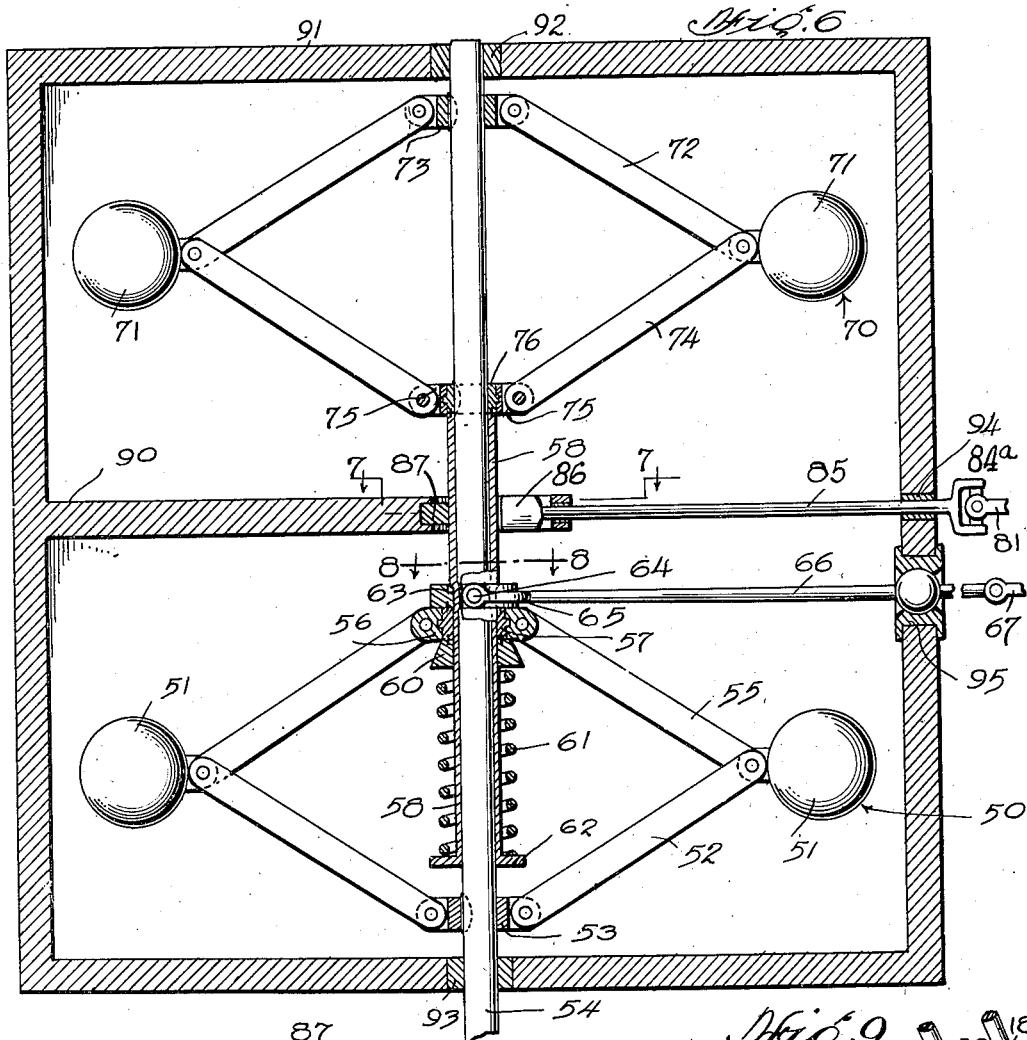
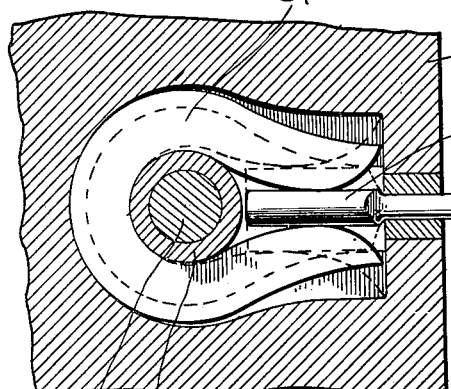
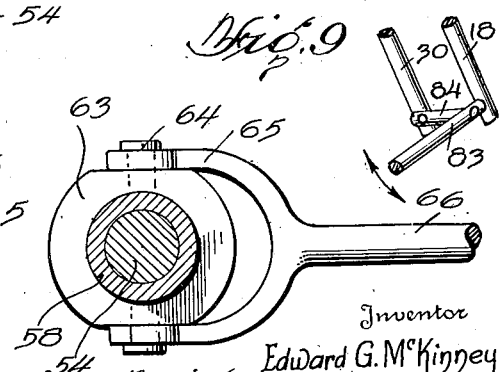
Inventor
Edward G. McKinney
By Blair & Kilcoyne
Attorneys Patented Feb. 22, 1938

2,108,970

UNITED STATES PATENT OFFICE 2,108,970

SYSTEM OF SPEED REGULATION

Edward G. McKinney, Enid, Okla.

Application April 20, 1934, Serial No. 721,643

20 Claims. (Cl. 264—4)

This invention relates to systems of regulation and control of vehicle engines, motors and the like and, while directed specifically to the regulation and/or control of the speed of an automotive vehicle, the invention is not limited thereto and is capable of broader application.

In the convention practice of speed regulation of an automotive vehicle, for example, the speed is regulated manually by controlling the fuel supply to the engine, generally of the internal combustion type, through a foot pedal or hand lever which is directly under the control of the operator and, by means of suitable linkage, is connected to a valve in the fuel supply line to the engine. As the foot pedal or hand lever is depressed or advanced, respectively, the speed of the vehicle is regulated proportionately. Where a constant rate of speed is desired, the foot pedal or the hand lever is held in a relatively fixed position to feed a constant quantity of fuel to the engine. Practically, however, the influence of topographical conditions, air or wind resistance to the movement of the vehicle, and the like render the maintenance of a constant speed virtually impossible by the aforesaid practice. Further, it is difficult for the operator of the vehicle, with the conventional pedal accelerator control, to hold the foot pedal depressed at a constant position for substantial periods of time due to the foot or leg becoming cramped.

Some attempts have hitherto been made to regulate the speed of a vehicle automatically as by the provision of speed governors or the like. Such attempts, while successful for certain uses, such as maintaining the speed of the car below a predetermined limit, have not been characterized by sufficient flexibility as to permit the application of this type of regulation to motor vehicles of present-day design. Further, no provision has been made for modification of the governor action to render the governor effective to provide regulation at any number of speed rates as determined by the operator, or as necessary under practical driving conditions, and, further, such systems have the attendant disadvantage that the rate of acceleration or deceleration was not under the control of the operator when changing from one speed (governor) setting to another.

Accordingly, among the objects of the present invention may be noted the provision of a system of speed regulation for motor vehicles which is selectively manual or automatic in operation, whereby to satisfy the requirements of all driving conditions encountered; the provision of a system of the above-described character in which change-over from manual to automatic regulation, or vice versa, can be effected in a simple and efficient manner; the provision of a system of speed regulation of the last above-mentioned character in which change-over from manual to automatic regulation can be effected at any speed determinable by the operator, with the automatic regulation thereupon functioning to maintain the speed at the determined rate; the provision of a system of automatic speed regulation for motor vehicles embodying speed regulating means whose functioning is under the control of the operator; the provision of a speed governor suitable for the regulation of the speed of a motor vehicle whose action may be modified at the will of the vehicle operator; the provision of a system of automotive speed regulation in which the rate of acceleration and/or deceleration is under the control of the operator when changing from one speed to another; the provision of an improved accelerator pedal lock, by the operation of which the speed of a motor vehicle can be set at a rate determinable by the operator without strain or discomfort to the operator; the provision of durable and efficient apparatus embodying the features above set forth; the provision of apparatus of the above general character which is so constructed as to be capable of application to motor vehicles of present-day design and which is in keeping with the requirements of such design.

Other objects will be in part obvious and in part hereinafter pointed out in connection with the following analysis of this invention, wherein is illustrated one of the various possible embodiments of the present invention, together with certain modifications in detail.

In the drawings—

Fig. 1 is a perspective view showing the application of a system in accordance with the present invention to a motor vehicle;

Fig. 2 is a section through the accelerator pedal taken along lines 2—2 of Fig. 1;

Fig. 3 is a section through the accelerator pedal and associated parts as illustrated in Fig. 1;

Fig. 4 is a section along lines 4—4 of Fig. 3;

Fig. 5 is a detail, partly in section along line 5—5 of Fig. 3, of a clutch mechanism in the manual regulating system as provided by the present invention;

Fig. 6 is a section through the governors of the automatic regulating system of the present invention;

Fig. 7 is a section along lines 7—7 of Fig. 6;

Fig. 8 is a section along lines 8—8 of Fig. 6; and

Fig. 9 is a detail of parts illustrated in Fig. 1.

Referring now to the drawings and particularly to Figs. 1, 2 and 3, the reference character 1 designates an accelerator pedal, preferably of the full length type to reduce foot and leg fatigue, the pedal being mounted to extend along the inclined foot board 2 of a vehicle body. The pedal may be suitably arranged to move on a transverse axis whereby the relatively forward part thereof may be depressed as is conventional, such mounting comprising a pivot pin 3 extending through a post or support 4 secured to the floor board 2 and a rib 5 extending from the under face of the pedal. The aforesaid parts are held in suitable relation as by a nut 6 secured to one end of the pin 3. The pedal 1 is also tiltable on a longitudinal axis by suitably hinging the rib 5 to the pedal 1 by the provision of a longitudinally extending pivot pin 7 which extends through the upper portion of the rib and through webs 8 or the like fixed to the pedal 1. A suitable pivot spring 9 may be provided to maintain the pedal 1 in normal level position except when positively held tilted. The pedal 1 is also preferably provided with a raised edge or flange 10 to prevent the foot from slipping off the pedal as it is tilted about the axis of pivot pin 7. The forward portion of pedal 1 is also hingedly related, as by a universal joint 12 which is coaxial with pivot pin 7, to a tube 13 extending downwardly within a tubular column 14 (Fig. 3), the said column being rigidly fixed to the floor board 2 by suitable means not shown. The tube 13 is provided with an upstanding lug 15 against which the pedal 1 is urged by a pivot spring or equivalent means 16 which augments the action of spring 9 to maintain the pedal 1 in normally horizontal or level position.

The tube 13 is slidably related within the tubular column 14 and has fixed to its lower portion by suitable means a rod 18 which extends generally downwardly and may terminate in an offset 20 which is connected by spring 21 to a fixed point 22 on the engine block, for example. From the foregoing description, it will be obvious that as downward foot pressure is exerted on pedal 1, the pedal is depressed about the axis of pivot pin 3 and downward motion of its forward end is transmitted through tube 13 to rod 18, against the urge of spring 21. Conversely, as foot pressure is relieved, spring 21 will urge rod 18, tube 13, and foot pedal 1 into its normal raised or idling position.

According to the present invention, I make provision for locking the foot pedal 1 and parts movable therewith in any position of depression, such means being operable upon tilting of the foot pedal 1 in an anti-clockwise direction about pivot pins 7 and 12. One form of such locking means is illustrated and will now be described. Leftwise of the pivot 12, foot pedal 1 carries a link 24 which is pivotally connected to the pedal as at 24a, the link at its other end being articulated to a bell crank lever 25 fulcrumed as at 26' in the tube 13. The other end of the bell crank 25 carries a brake shoe 26 which extends through a longitudinal slot 27 provided in the tube 13, whereby the braking surface of the shoe may engage against the inner surface of the tubular column 14. The tube 13 carries at its upper end portion a stop lug 27' which functions to limit the tilting movement of the pedal 1. Thus link 24 and bell crank 25, upon tilting of the foot pedal 1, forces the brake shoe 26 into braking engagement with tube 14, it being understood that such braking action can be obtained during any position of depression of foot pedal 1 and tube 13 movable therewith. I propose to fabricate the bell crank lever 25 of spring steel and so proportion the parts that braking engagement between shoe 26 and column 14 is had prior to the full tilting movement of foot pedal 1, with the bell crank flexing to allow continued tilting movement of the pedal 1 until the latter engages stop 27', the additional rotation being provided for a purpose to be described.

Foot pedal 1 further carries a clutch operating rod 30, the rod being pivoted to the pedal as at 31 and extending axially through the tube 13 and column 14 and generally parallel to the rod 18 previously described. As pedal 1 is tilted about the axis of pivot pins 7 and 12, it will be seen that axial movement is transmitted to clutch rod 30, the additional rotation permitted pedal 1 subsequent to braking action by the flexibility of crank 25 serving to cause an appreciable axial movement thereof relative to rod 18.

By reference to Figs. 1, 2 and 5, a clutch housing generally designated at 32 is rigidly secured to rod 18, the housing being suitably enlarged in the direction away from rod 18 and recessed as at 33 to provide a seat for a U-shaped clamping ring 34 of spring steel. A rod 35 extends axially through housing 32 and in parallel relation to rods 18 and 30. The normal action of clamping ring 34 is to bind against the rod 35, which latter is slidably mounted in a fixed bearing support 36 adjacent one end and has its other end connected to a bell crank 37. The bell crank 37 is suitably articulated to push rod 38 which is connected to the throttle valve V generally located in the intake line to the engine E.

Assuming normal pedal regulation, rod 35 is clutched through the medium of clamping spring 34 to rod 18 connected through the medium of tube 13 to foot pedal 1. Depression of the foot pedal depresses rod 18 and clutch housing 32 carried thereby, and also the rod 35 clutched to rod 18. Consequently, the bell crank 37 is actuated about its point of support to actuate push rod 38 to open the throttle valve and admit an increased fuel supply to the engine. Release of the foot pressure on pedal 10 causes the parts to return to their normal raised or idling position due to action of spring 21.

To effect de-clutching of rod 35 from rod 18, foot pedal 1 is tilted as previously described, such action imparting axial movement to the clutch rod 30 relatively of rod 18. This relative axial movement is utilized in de-clutching rods 18 and 35 in the following manner. A cam 40 has its stem portion trunnioned for rotation in rod 18, the cam portion extending intermediate said rods and being disposed between the legs of the U-shaped clamping ring 34. The stem portion of the cam 40 has rigidly secured thereto a link 42, the link extending to the clutch rod 30 and being flexibly connected thereto as by pin 43. As clutch rod 30 is moved axially relative to rod 18, link 42 is actuated in a rotary direction about the relatively fixed axis of cam 40 and causes rotary movement of the cam whose design is such that its high points engage the ends or legs of clamping ring 34 to spread the same. The spreading action releases the binding pressure of the ring 34 on rod 35 and effects a disconnection between rod 18 and rod 35. Thus as pedal 1 is tilted in an anti-clockwise direction, locking of the pedal 1 in any depressed position as determined by the operator is effected and, simultaneously, disconnection between the foot pedal 1 and push rod 38 is had.

Considering now the means for automatically regulating the speed of the vehicle upon locking of pedal 10 in a depressed position and simultaneous disconnection of the manual control, reference is made to Figs. 1, 6, 7 and 8. Reference character 50 indicates generally a governor of the fly-ball type hereinafter termed the main governor, which comprises the fly-balls 51 linked as by links 52 to a ring 53 fast on shaft 54, which may be a stub shaft driven from the drive shaft of the vehicle which is suitably driven from the crank shaft of the engine to be regulated. Companion links 55 extend between the balls 51 and a slip ring 56 dove tailed or morticed to the non-rotatable guide ring 57 which is arranged about an axially movable tube 58 on stub shaft 54, which tube will be more fully described hereinafter. The guide ring 57 has fixed to one side thereof a spring retaining ring 60 for a loading spring 61 disposed about the tube 58, the other end of the spring being retained by a ring or flange 62 at one end of tube 58. Guide ring 57 has fixed to its other side a yoke ring 63, to which is pinned, as by pins 64, a yoke 65 formed at the end of a rod 66, the other end of which is connected to an arm of a bell crank 67 (Fig. 1). The said bell crank is mounted from a fixed support 68 and has its other arm articulated to the push rod 38 heretofore described.

From the foregoing description and under the assumption that retaining ring or flange at end of tube 58 remains in a fixed position, it will be apparent that fly-ball action of the main governor, upon rotation of the shaft 54 driven from the main shaft of the vehicle, is transmitted to yoke ring 63 and in turn, by linkage 66, 67 and 38 is transmitted to the throttle valve in the fuel supply line to the engine.

Considering now the means for controlling the action of the main governor 50, I provide an auxiliary governor or speed setting governor generally indicated at 70 whose function it is to load the main governor during normal pedal actuation whereby the main governor setting corresponds to the speed at which the vehicle is traveling, and which also functions to set the main governor to the speed at which the vehicle is running at the instant of change-over from manual to automatic regulation. Said auxiliary governor 70 has fly-balls 71 substantially identical to the balls 51 and which are linked as by links 72 to a ring 73 fast in the stub shaft 54. Companion links 74 connect the balls 71 with a slip ring 75 dovetailed to a non-rotary guide ring 76 to which is secured the other end of the tube 58 previously referred to. Fly-ball action of the main and auxiliary governors 50, 70, respectively, being identical due to proportioning of the fly-balls but opposite by reason of the opposed action thereof at the same car speed, results in the main governor being loaded by the action of fly-balls 71 being transmitted through tube 58 to vary the compression of spring 61 in accordance with speed conditions. Thus, under normal pedal actuation, the auxiliary governor constantly sets the compression of spring 61 so that the main governor setting is the speed existing at any moment.

Considering now the mechanism for causing the auxiliary or speed setting governor 70 to set the governor 50 at the speed obtaining at the instant of change-over, reference is made to Figs. 1, 6 and 9, and to the previous description of the axial movement relative to rod 18 given the clutch rod 30 as pedal 1 is tilted. I utilize such axial movement to cause rotation of the telescoping elements 80, 81 which are of irregular cross-section, preferably square, whereby they may transmit such rotation. The telescoping element 80 is universally jointed at its end, as at 82, with a stem 83 extending through and journaled in rod 18. The stem 83 has fixed thereto a pin 84 which extends to and is flexibly connected to the axially movable rod 30. As pedal 1 is tilted, rod 30 moves lengthwise relative to rod 18 and causes pin 84 to rotate the stem 83 on its axis, which rotation is transmitted to telescoping elements 80, 81. The element 81 is universally jointed as at 84a to a cam rod 85 which carries at its end a cam surface 86, the cam rod being rotatable by rotation of the telescoping rods 80, 81. The cam end 86 extends between the ends of a clamp 87, preferably U-shaped and of spring steel, which is disposed about the tube 58 which latter is responsive to fly-ball action of governor 70. The clamp 87 is so arranged that it effects no clutching or locking action on tube 58 during normal pedal actuation. That is to say, the cam end 86 normally acts to spread the ends of the clamp 87 whereby tube 58 may move freely therethrough. At the instant of change-over from manual to governor regulation, however, cam rod 85 is turned on its axis in accordance with the foregoing and the ends of the clamp 87 spring towards each other to clamp against the periphery of the tube 58 and lock the same against movement in response to actuation of governor 70. Such action in turn sets the compression of spring 61, and the main governor 50 is consequently set to the rate of speed obtaining at the instant of change-over. If the vehicle speed falls below that to which the governor 50 is set, the action of spring 61 tends to open the throttle valve to the engine to admit an increased fuel supply. On the other hand, if the speed increases above that to which the governor is set, the action of the fly-balls 51 acts against the urge of spring 61 to reduce the fuel supply.

It will be understood that the position of clamp or clutch 87 is fixed and, conveniently, may be arranged in a suitable recess in a fixed part such as an arm 90 which extends from a housing 91 in which the governors 50, 70 are enclosed whereby to prevent admission of dirt or dust thereto. The stub shaft may be journaled in suitable bearings 92, 93 at the ends of said housing, and similarly cam rod 85 may extend through a bearing 94 in one wall of the housing. I further propose to mount in the housing wall a ball joint 95 through which yoked rod 66 extends, such form of joint permitting tilt of the rod 66 about the center of the ball of the joint and at the same time permitting axial movement of said rod. The provision of such a sealed joint also serves to exclude dust and dirt from the interior of the housing.

The operation of my regulating system will now be described generally. If manual regulation is desired, the operator depresses pedal 1 as usual, such depressing tube 13, rod 18 and rod 35 clutched thereto, and actuating bell crank 37 and push rod 38. During such manual regulation, governors 50, 70 may act normally in response to vehicle speed, with governor 70 acting to constantly set governor 50 at the speed at which the vehicle is traveling. If the operator has brought the vehicle to a desired speed, such as forty miles per hour, and desires to maintain that speed for a substantial period of time thereafter, the pedal 1 is tilted in a counterclockwise direction and held tilted by a slight pressure of the foot. It being understood that the pedal, prior to tilting, had been depressed sufficiently to bring the car to the 40-mile rate of speed, the tilting action automatically locks the pedal 1 in its depressed position, simultaneously declutches rods 18, 35, and rotates the telescoping elements 80, 81 which in turn rotate cam rod 85. This rotation actuates the clamp 87 into clutching engagement with tube 58, fixes the position of retaining ring or flange 62 and consequently fixes the compression of spring 61, it being understood that the fly-balls 51 and 71 are in a position defined by the 40-mile rate of speed. Regulation is now effected wholly through the governor 50, with spring 61 tending to increase the speed if the same falls off, and the fly-balls tending to decrease the speed if the 40-mile rate is exceeded.

If the operator now desires to return to the manual or pedal control, he returns the pedal 1 to its level position. Such action serves to release the braking shoe 26 whereby the pedal may be freely actuated in a fore and aft direction, and also clutches the rod 18 to rod 35 to bring the push rod 38 under the control of the pedal. The leveling of the pedal also acts to actuate the clutch rod 30 in an axially upward direction relative to rod 18 and thus rotates the telescoping elements 80, 81. Such rotation causes the cam 86 to spread the spring clamp 87 and release the tube 58 so that it may move in response to fly-ball action of governor 70. Consequently, governor 70 now is operative to load the spring 61 and set governor 50 at the speed at which the vehicle is traveling as determined by the manually operable pedal 1.

The above-described system of speed control is simple and efficient in operation and can be readily installed on all cars of present-day make and design. While having a high degree of utility as applied to a motor vehicle not utilizing free-wheeling principles and the like, it is also adaptable to vehicles utilizing free-wheeling as the governor arrangement aforesaid functions to reduce engine speed to idling when the car coasts faster than set speed and brings the engine back up to speed when the car slows down below set speed, all without the attention of the driver. The system above described is further one that is capable of inexpensive fabrication and application.

It will be understood that the above described system is one capable of modification and substitution without departing from the spirit and scope of the present invention, and all such modifications and substitutions, as would be discernible to one skilled in the art, are intended to be embraced within the scope of the present disclosure. So also, it will be understood that the herein described system of regulation and control has application to driving motors and engines generally, and is broader in its application than to the regulation of the speed of automotive vehicles driven by engines of the internal combustion type.

As many changes could be made in carrying out the above constructions without departing from the scope of the invention, it is intended that all matter contained in the above description or shown in the accompanying drawings shall be interpreted as illustrative and not in a limiting sense.

I claim:

1. In an apparatus of the character described, the combination of a vehicle engine, a fuel supply line thereto, a throttle valve in the fuel supply line, manual means operatively related to said throttle valve for actuating the same, automatic means operatively related to the throttle valve for actuating the same, and means for simultaneously rendering one of said means effective and the other means ineffective to actuate said valve, said last-named means including mechanism continuously adjusting the automatic means to speeds developed by said engine when said valve is actuated by said manual means.

2. In an apparatus of the character described, the combination of a vehicle engine, a fuel supply line thereto, a throttle valve in the fuel supply line, manual means operatively related to the throttle valve for actuating the same, automatic means operatively related to the throttle valve for actuating the same, and means for selectively rendering one of said means ineffective to actuate the throttle valve, said last-named means being operable upon actuation to render the other means effective to actuate the throttle valve and including mechanism continuously adjusting said automatic means to speeds developed by said engine when said valve is actuated by said manual means.

3. In an apparatus of the character described, the combination of a vehicle engine, a fuel supply line thereto, a throttle valve in the fuel supply line, manual means operatively related to the throttle valve for actuating the same, automatic means operatively related to the throttle valve for actuating the same, adjusting mechanism associated with said automatic means for adjusting continuously said automatic means to speeds developed by said engine when the valve is actuated by said manual means, one of said means being normally effective to actuate the throttle valve, and means including said mechanism for rendering said one means ineffective and simultaneously therewith for rendering the other means effective to actuate the valve.

4. In an apparatus of the character described, the combination of a vehicle engine, a fuel supply line thereto, a throttle valve in the fuel supply line, manual means connected to said valve and normally effective to actuate the same, automatic means connected to said valve and normally ineffective to actuate the same, adjusting mechanism associated with said automatic means for adjusting continuously said automatic means to speeds developed by said engine when the valve is actuated by said manual means, means for rendering said manual means ineffective to actuate said valve, and means responsive to the actuation of said last-named means for interrupting actuation of said adjusting mechanism whereby to render said automatic means effective to actuate said valve.

5. In a system of speed regulation for motor vehicles having a fuel supply line to the engine thereof and a throttle valve in the fuel supply line, the combination of operator controlled means operatively related to said valve for actuating the same, speed governor means operatively related to said valve for actuating the same, means under the control of the operator for selectively rendering one of said means effective and the other means ineffective to control said valve, and means continuously adjusting the setting of the speed governor means to correspond to speeds developed by said engine when said valve is actuated by said operator controlled means.

6. In a system of speed regulation for motor vehicles having a fuel supply line to the engine thereof and a throttle valve in the fuel supply line, the combination of operator controlled means operatively related to the valve for actuating the same, speed governor means operatively related to the valve for actuating the same, one of said means being normally effective to actuate said valve, means for rendering said last-named means ineffective and the other means effective to actuate said valve, and means continuously adjusting the setting of the speed governor means to correspond to speeds developed by said engine when said valve is actuated by said operator controlled means.

7. In a system of speed regulation for motor vehicles having a fuel supply line to the engine thereof and a throttle valve in the fuel supply line, a manually actuable element connected to the valve and normally effective to actuate the same, a speed governor connected to the valve, means continuously adjusting the setting of the governor to correspond to speeds developed by said engine when said valve is actuated by said element whereby said governor is normally ineffective to actuate the valve, and means for rendering the element and said adjusting means ineffective and the speed governor effective to actuate the valve.

8. In a system of speed regulation for motor vehicles having a fuel supply line to the engine thereof and a throttle valve in the fuel supply line, a manually actuable element connected with the valve and normally effective to actuate the same, a speed governor connected with the valve but normally ineffective to actuate the same, and means for rendering said element ineffective and for rendering the speed governor effective to actuate the valve, said means being operative at any position of actuation of the element as determined by the operator.

9. In a system of speed regulation for motor vehicles having a fuel supply line to the engine thereof and a throttle valve in the fuel supply line, a manually actuable element connected with the valve and normally effective to actuate the same, a speed governor connected with the valve, means for continuously adjusting the speed governor setting to correspond to vehicle speeds developed by the engine under control of the manually actuable element, whereby said speed governor is normally ineffective to actuate said valve, and means for rendering said element and said adjusting means ineffective whereby to render the speed governor effective to actuate the valve.

10. In a system of speed regulation for motor vehicles having a fuel supply line to the engine thereof and a throttle valve in the fuel supply line, a manually actuable element connected with the valve and normally effective to actuate the same, a speed governor connected with the valve, means for continuously adjusting the speed governor setting to correspond to vehicle speeds developed by the engine under the control of said manually actuable element, whereby said speed governor is normally ineffective to actuate the valve, means to render said manually actuable element ineffective to actuate the valve and at the same time to render said adjusting means inoperative, and means responsive to the actuation of said last-named means for adjusting the governor to a fixed rate of speed corresponding to the vehicle speed obtaining at the instant of change-over.

11. In a system of speed regulation, the combination of a governor connected in controlling relation to an engine or the like, means continuously setting the governor in accordance with varying rates of speed developed by said engine, and means for setting the governor to a fixed rate of speed within the range of speed rates developed by said engine.

12. In a system of speed regulation, the combination of a governor connected in controlling relation to an engine or the like, means operative to adjust continuously the governor in accordance with varying rates of speed developed by said engine, means operative to set the governor to function at a fixed rate of speed within the range of speed rates developed by said engine, and means for selectively rendering one of said means effective.

13. In a system of speed regulation, the combination of a governor arranged in controlling relation to an engine or the like, means for adjusting the governor in accordance with varying rates of speed developed by said engine, and means for interrupting such adjustment and simultaneously therewith for adjusting the governor to a determined fixed rate of speed within the range of speed rates developed by said engine.

14. In a system of speed regulation, the combination of a governor arranged in controlling relation to an engine or the like, an auxiliary governor operatively related to said first governor and adapted normally to adjust the first governor in accordance with varying rates of speed developed by said engine, and means for interrupting such adjustment function of the auxiliary governor and simultaneously adjusting said first governor to a determined rate of speed within the range of speed rates developed by said engine.

15. In a system of speed regulation, the combination of a governor arranged in controlling relation to an engine or the like, an auxiliary governor normally opposing said main governor and operative to adjust the main governor in accordance with varying rates of speed developed by said engine, and means operative at will to render said auxiliary governor inoperative for such adjustment, and simultaneously to adjust said main governor to a fixed rate of speed within the range of speed rates developed by said engine.

16. In a system of speed regulation, the combination of an engine or the like, manual means normally operative to control the same, a governor in controlling relation to the engine, means continuously adjusting said governor to the varying rates of speed developed by said engine under said manual control, and means for changing over from the manual to the governor control, said last-named means being operative to render the adjusting means inoperative.

17. In a system of speed regulation, the combination of an engine of the like, manual means normally operative to control the same, a governor in controlling relation to the engine, means for adjusting said governor to the varying rates of speed developed by said engine under said manual control, and means for changing over from the manual to the governor control, said last-named means being operative to render the adjusting means inoperative, and to adjust the main governor to a fixed rate of speed corresponding to the rate obtaining at the instant of change-over.

18. In a system of speed regulation, the combination of an engine or the like, manual means normally operative to control the same, a governor for controlling the same, means continuously adjusting the governor in accordance with the varying rates of speed developed by said engine or the like under said manual control, means for changing over from the manual to the governor control means, said last-named means being operative to render said adjusting means inoperative and to adjust the governor to a fixed rate of speed which corresponds to the speed rate obtaining at the instant of change-over.

19. In a system of speed regulation, the combination of an engine or the like, manual means normally operative to control the same, a main governor for controlling the same, an auxiliary governor normally opposing controlling action of said main governor, and means for disconnecting said manual control means from and simultaneously therewith for establishing the main governor in controlling relation to said engine, and means responsive to actuation of said last-named means to set the main governor to the rate of speed obtaining at the instant of disconnection of said manual control means.

20. In a system of speed regulation, the combination of an engine or the like, manual means normally operative to control the same, a main governor for controlling the same, an auxiliary governor normally adjusting the main governor speed setting to correspond to varying speeds developed by the engine under the control of said manual means, means for disconnecting the manual means from controlling relation with the engine, and means responsive to said last-named means to set the auxiliary governor at the rate of speed obtaining at the instant of disconnection of the manual control means, whereby to adjust the main governor to the aforesaid rate of speed.

EDWARD G. McKINNEY.